Patented Nov. 20, 1934

1,981,588

UNITED STATES PATENT OFFICE 1,981,588

TRANSPARENT FILM OR LAYER

Henry V. Dunham, Bainbridge, N. Y.

No Drawing. Application October 4, 1932, Serial No. 636,258

7 Claims. (Cl. 18—57)

When casein is dissolved in water by means of an alkali or other casein solvent, and applied to glass or used in making a film or even in some cases when applied in a thin coating to leather in the finishing operations, there is oftentimes a tendency for the resulting film to be more or less cloudy in appearance and not wholly transparent. Where great brilliancy and transparency are required this is an objection. Sometimes on the finishing of black leather for example, the opalescence of the resulting casein films gives the leather a corresponding somewhat grayish finish or a slightly milky appearance, hence there may be obtained a finish having not as great a brilliancy as for instance when blood albumen is used for a finishing coat of leather.

The same is true when casein film is made on or applied to glass or colored paper. The casein solution may be applied to the glass and removed as a film when partially dry, but this film, even when completely dry still retains its somewhat opaque appearance. Even though the casein solution may be refined by careful filtering or other means, it frequently still possesses some of the opacity objectionable where superior transparency is desired.

I have found that it is possible to overcome in a very simple and easy manner, the lack of transparency in films prepared from casein solutions. My method consists in adding a small amount of methyl diphenyl amine. This method may be conducted in several ways. The methyl diphenyl amine may be added to the water that is used to form the casein solution or if desired one may add the methyl diphenyl amine directly to the dry casein and let this dry casein absorb it prior to the dissolving of the casein by means of alkalies.

I have found that for most kinds of casein about 2 parts of methyl diphenyl amine used with 100 parts of the casein is sufficient to produce a perfectly transparent film from an alkalized casein solution. However, I do not limit myself to this exact percentage as I have found that the amount can be varied somewhat depending upon the purity of the casein employed and other factors, but in general on a good grade of casein 2% of methyl diphenyl amine is sufficient.

Of course it is to be understood that one may add other substances such as glycerine, invert sugar and other softening agents if desired, but in this case care must be taken that these softening agents do not themselves tend to produce opaqueness in the film. An illustrative example would be as follows:

To 100 pounds of dry casein, 2 pounds of methyl diphenyl amine are added, thoroughly mixed and allowed to stand a few hours until the methyl diphenyl amine has penetrated fairly well into the casein particles. The mixture is then dissolved in the same manner as casein is dissolved, for instance, to 100 pounds of the treated casein as mentioned above, there is added 400 pounds of cold water, thoroughly mixed and 7 pounds of 26° Bé. ammonia water is then added. After complete solution is obtained the solution may be partially neutralized or rendered slightly acidic by slowly adding weak formaldehyde solution until, if desired, the solution shows slightly acid to blue litmus paper. If desired, glycerine may be added, for example 20 pounds of gylcerine to 100 pounds of the dry casein, and the mixture well stirred. The resulting mixture may then be diluted as desired and applied as a film to leather, book cloth or for any other purpose where a film is desired.

*Second method.*—To 400 pounds of water, 2 pounds of methyl diphenyl amine is added. 100 pounds of casein is then added, mixed thoroughly and 7 pounds of ammonia added and the process continued as described under No. 1.

*Third method.*—400 pounds of water, add 100 pounds of casein, mix, add 7 pounds of ammonia, proceed as described under No. 1 and then add 2 pounds of methyl diphenyl amine.

This last example in general is not quite as satisfactory as the preceding ones so far as uniformity of resulting products is concerned.

I can also make transparent sheets or films of casein composition, by using the above described aqueous solutions made from casein, and containing about 2% or so of methyl diphenyl amine, in the ordinary film-making roller machines such as are commonly used for making nitrocellulose films, cellulose acetate films, etc.

I make no claim for a casein film or casein coating free from methyl diphenyl amine but only claim the use of methyl diphenyl amine in a casein solution for the purpose of producing films which are more transparent than when casein is used without the addition of this compound.

I claim:

1. A casein film of a high degree of transparency containing a small amount of methyl diphenyl amine.

2. A casein film of high degree of transparency, formed from an aqueous solution, containing about 2% of methyl diphenyl amine.

3. An aqueous solution of a casein material which contains a small percentage of methyl diphenyl amine.

4. An aqueous solution of a casein material which contains an amount of methyl diphenyl amine equal to about 2% of the weight of casein present.

5. An alkaline aqueous solution of a casein material which contains a small percentage of methyl diphenyl amine.

6. In making highly transparent film-form structures from a solution of casein in water and alkali, the herein described steps of neutralizing a large part, at least, of the alkali by formaldehyde solution, and at any stage of the process, before drying the solution, adding a small percentage of methyl diphenyl amine.

7. An aqueous solution of casein which contains an amount of methyl diphenyl amine equal to about 2%, figured on the amount of casein and a softening agent.

HENRY V. DUNHAM.